(12) United States Patent  
Uchino et al.

(10) Patent No.: US 7,903,323 B2  
(45) Date of Patent: Mar. 8, 2011

(54) IMAGE DISPLAY APPARATUS

(75) Inventors: Satoshi Uchino, Tokyo (JP); Okushi Okuyama, Tokyo (JP); Yukio Hosoya, Tokyo (JP); Hiroyuki Konno, Tokyo (JP); Kouji Shibata, Tokyo (JP); Tatsuya Nagase, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/697,533

(22) Filed: Feb. 1, 2010

(65) Prior Publication Data

US 2010/0208330 A1 Aug. 19, 2010

(30) Foreign Application Priority Data

Feb. 16, 2009 (JP) .................................. 2009-032731

(51) Int. Cl.  
*G02B 26/00* (2006.01)  
(52) U.S. Cl. ....................................................... 359/296  
(58) Field of Classification Search .................. 359/296; 345/107, 105; 430/32, 34, 38; 204/600, 204/450  
See application file for complete search history.

(56) References Cited

U.S. PATENT DOCUMENTS

| 7,436,379 | B2* | 10/2008 | Matsuura et al. ............... 345/84 |
| 7,772,754 | B2* | 8/2010 | Lee et al. ...................... 313/292 |
| 2006/0263927 | A1 | 11/2006 | Sakurai et al. |

FOREIGN PATENT DOCUMENTS

| JP | 2004226768 | 8/2004 |
| WO | 2004077140 | 9/2004 |

* cited by examiner

*Primary Examiner* — Ricky L Mack  
*Assistant Examiner* — Tuyen Q Tra  
(74) *Attorney, Agent, or Firm* — Lucas & Mercanti, LLP

(57) ABSTRACT

An image display apparatus comprising two substrates at least one of which is transparent, ribs for maintaining a distance between the substrates and display particles that are sealed between the substrates in a powder state, and displaying an image by generating an electric field between the substrates so that the display particles are moved, wherein of contact faces to the display particles in the gap between the substrates, at least the contact faces of ribs to the display particles have an arithmetic average roughness Ra in a range from 0.01 to 0.20 μm and an average interval Sm of irregularities in a range from 0.5 to 2.5 μm.

11 Claims, 6 Drawing Sheets

(a) before application of voltage (switch OFF)

(b) after application of voltage (switch ON)

(a)

(b)

(c)

IMAGE DISPLAY APPARATUS

This application is based on application No. 2009-032731 filed in Japan, the contents of which are hereby incorporated by reference.

BACKGROUND OF THE INVENTION

1. Field of the Invention

The present invention relates to an image display apparatus that can execute displaying and erasing operations of images repeatedly by moving display particles in a gaseous phase in response to an electrical field.

2. Description of the Related Art

Conventionally, an image display apparatus that displays images by moving display particles in a gaseous phase has been known. The image display apparatus has a structure in which display particles in a powder state are sealed between two substrates at least one of which is transparent, and by generating an electric field between the substrates, the display particles are moved and adhered to one of the substrates so that an image is displayed. Upon driving such an image display apparatus, a voltage is applied between the substrates to generate an electric field, and the display particles are moved along the electric field direction so that by selecting the electric field direction on demand, displaying and erasing operations of images can be repeatedly executed.

However, once the display particles are adhered to the substrate, the display particles become unmovable in an adhered state to the substrate since the display particles have comparatively high adhesive strength, resulting in a problem such that the contrast between an image portion and a non-image portion deteriorates.

Therefore, a technique has been disclosed in which a substrate surface is treated by using hexamethyl disilazane (International Publication No. WO2004/077140 Pamphlet).

Another technique has been disclosed in which particles having a fine primary particle size are scattered on a substrate surface so that the contact area of the display particles to the substrate is reduced to consequently reduce adhesive strength (JP-A No. 2004-226768).

However, even when any of the above-mentioned techniques are used, it is not possible to obtain a sufficient adhesive-strength-reducing effect, and the problem of contrast is caused. The problem of contrast becomes conspicuous as the displaying operation of image display apparatus is repeatedly carried out.

BRIEF SUMMARY OF THE INVENTION

An objective of the present invention is to provide an image display apparatus that can repeatedly display images with sufficiently superior contrast between an image portion and a non-image portion for a long period of time.

The present invention provides to an image display apparatus including two substrates at least one of which is transparent, ribs for maintaining a distance between the substrates and display particles that are sealed between the substrates in a powder state, and displaying an image by generating an electric field between the substrates so that the display particles are moved, wherein of contact faces to the display particles in the gap between the substrates, at least the contact faces of ribs to the display particles have an arithmetic average roughness Ra in a range from 0.01 to 0.20 µm and an average interval Sm of irregularities in a range from 0.5 to 2.5 µm.

DETAILED DESCRIPTION OF THE INVENTION

The present invention relates to an image display apparatus including two substrates at least one of which is transparent, ribs for maintaining a distance between the substrates and display particles that are sealed between the substrates in a powder state, and displaying an image by generating an electric field between the substrates so that the display particles are moved, wherein of contact faces to the display particles in the gap between the substrates, at least the contact faces of ribs to the display particles have an arithmetic average roughness Ra in a range from 0.01 to 0.20 µm and an average interval Sm of irregularities in a range from 0.5 to 2.5 µm.

In accordance with the present invention, since the adhesive strength of the display particles to the surfaces of ribs can be reduced, it becomes possible to repeatedly display images with sufficiently superior contrast between an image portion and a non-image portion for a long period of time.

Image Display Apparatus

The image display apparatus in accordance with the present invention is provided with two substrates at least one of which is transparent, ribs for maintaining a distance between the substrates and display particles that are sealed between the substrates in a powder state, and displays an image by generating an electric field between the substrates so that the display particles are moved, wherein of contact faces to the display particles in the gap between the substrates, at least the contact faces of ribs to the display particles have predetermined surface roughness.

Referring to figures, the following description will explain the image display apparatus of the present invention in detail. Additionally, the image display apparatus relating to the present invention is referred to as "powder display".

Figure 1:
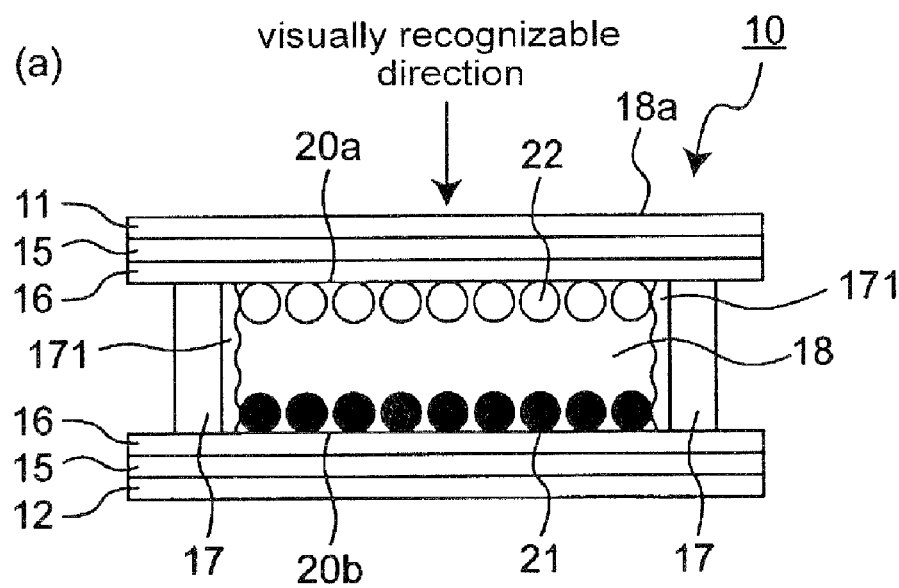
FIG. 1 is a schematic drawing that shows a cross-sectional structure of one example of the image display apparatus in accordance with the present invention.
Figure 1:
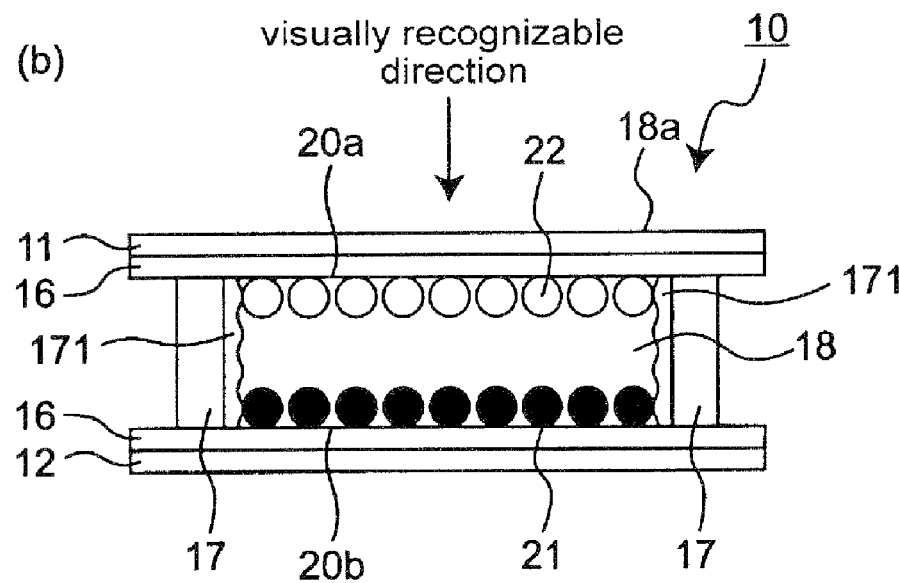
Figure 5:
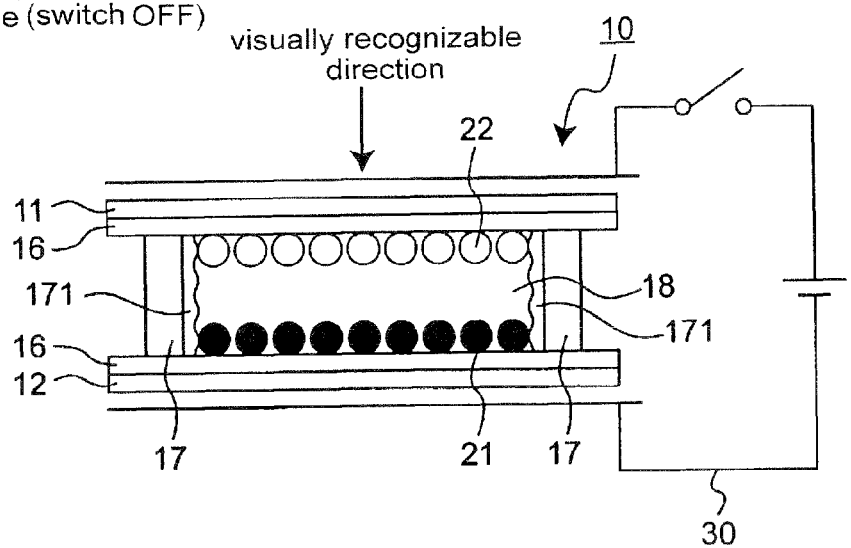
FIG. 5 is a schematic drawing that shows another example of movements of display particles caused by a voltage application between substrates.
Figure 5:
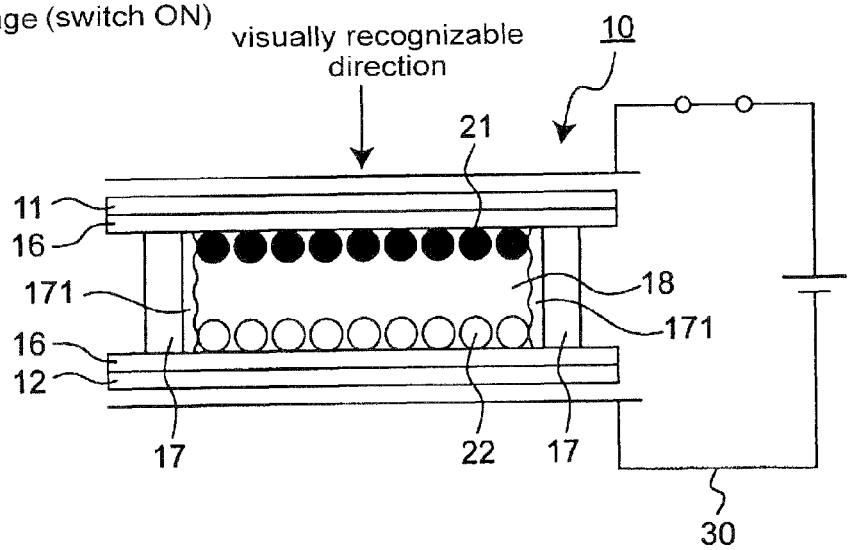

FIG. 1 shows typical cross sections of the image display apparatus in accordance with the present invention. FIG. 1(a) shows a structure in which an electrode 15 having a layer structure is formed on each of substrates 11 and 12, with an insulating layer 16 being formed on the surface of each electrode 15. The image display apparatus shown in FIG. 1(b) has a structure in which no electrode is provided in the image display apparatus of FIG. 1(a), and is designed so that an electric field is applied by electrodes provided on the outside of the apparatus so as to move the display particles. In FIG. 1(a) and FIG. 1(b), the same reference numerals represent the same member. FIG. 1 indicates FIG. 1(a) and FIG. 1(b) in a manner to be included therein. An image display apparatus 10 of FIG. 1 is supposed to be used for viewing images from the substrate 11 side as shown in the figure; however, the present invention is not intended to be limited by the structure in which images are viewed from the substrate 11 side. Since the apparatus is provided with no electrode 15, the apparatus having a type indicated by FIG. 1(b) can be simplified in its apparatus structure and is advantageous in that its manufacturing processes can be shortened. FIG. 5 shows a state in which the image display apparatus 10 of the type shown in FIG. 1(b) is set in a device capable of applying a voltage so that the voltage is applied thereto. The cross-sectional structure of the image display apparatus of the present invention is not intended to be limited by those shown in FIGS. 1(a) and 1(b).

On the outermost portion of the image display apparatus 10 of FIG. 1(a), two substrates 11 and 12 that form a case constituting the image display apparatus are arranged so as to be opposed to each other. Electrodes 15 used for applying a voltage are provided on the respective surfaces of the substrates 11 and 12 on the mutually opposed sides, and insulating layers 16 are further formed on the respective electrodes 15. The electrode 15 and the insulating layer 16 are provided on each of the substrates 11 and 12, and display particles are located in a gap 18 that is formed by making the surface sides having the electrode 15 and the insulating layer 16 face to face with each other.

Also, on the outermost portion of the image display apparatus 10 of FIG. 1(b), two substrates 11 and 12 that form a case constituting the image display apparatus are arranged so as to be opposed to each other. Insulating layers 16 are provided on the respective surfaces of the substrates 11 and 12 on the mutually opposed sides. The insulating layers 16 are provided on each of the substrates 11 and 12, and display particles are located in a gap 18 that is formed by making the surface sides having the insulating layer 16 face to face with each other.

In the image display apparatus 10 shown in FIG. 1, two kinds of display particles, that is, black display particles 21 (hereinafter, referred to as black particles) and white display particles 22 (hereinafter, referred to as white particles) are located in the gap 18 as display particles.

In the image display apparatus 10 of FIG. 1, the gap 18 is surrounded by the substrates 11 and 12 and two ribs (barrier ribs) 17 on four sides thereof, and the corresponding gap 18 forms the minimum structural unit serving as one cell; however, in general, a structure is prepared in which a plurality of such cells are installed.

The rib 17 is used for ensuring the gap 18 between the substrates by maintaining the distance between the substrates, and as shown on the right side and left side of FIG. 2(A), it may be formed not only on the edges of the substrates 11 and 12, but also inside thereof, if necessary. The width of the rib 17, in particular, the width of the rib on an image display surface 18a side, is desirably made as thin as possible from the viewpoint of ensuring clearness of a displayed image, for example, as shown on the right side of FIG. 2(A).

The rib 17 to be formed inside between the substrates 11 and 12 may be formed continuously, or may be formed intermittently, in a direction from the surface to the rear surface as shown on the right side and left side of FIG. 2(A).

By controlling the shapes and arrangements of the ribs 17, cells having the gaps 18 separated by the ribs 17 can be arranged with various shapes. FIG. 2(B) shows an example of the shapes and arrangements of the ribs 17 and the cells (gaps) 18 at the time when viewed from the image display surface 18a side. As shown in FIG. 2(B), the cells 18 may be formed into a square shape, a triangular shape, a line shape, a circle shape, a hexagonal shape or the like, and a plurality of the cell may be arranged as a lattice, a honeycomb or a network.

Although not particularly limited as long as an object of the present invention is achieved, the dimensions of the rib 17 are normally designed so that the height is 5 to 100 μm, in particular, preferably 20 to 60 μm, and the width (thickness) is 1 to 50 μm, in particular, preferably 5 to 15 μm.

The ribs 17 may be formed at least on one of the substrates 11 and 12, and are normally formed on one of the substrates. In a case where an electrode is solely formed on the substrate, the ribs 17 are formed on the corresponding electrode, and in a case where an electrode and an insulating film are formed on the substrate, the ribs 17 are formed on the corresponding insulating film.

The rib 17 may be formed, for example, by using a resin material, through a method such as a photolithography method, a screen printing method and an in-printing method.

More specifically, for example, when the photolithography method is used, first, a photo-curable epoxy resin solution is applied so as to form a dried thickness corresponding to a desired rib height. A photo-mask is placed on the resin film so that cell areas having a desired shape and arrangement are not exposed, and an exposing process is carried out thereon. Thereafter, by removing the resin film located on non-exposure portions by using a developing solution, desired ribs can be formed. As the resin material for forming the ribs, any photo-curable resin may be used, and specific examples thereof include a photo-curable acrylic resin and the like, in addition to the photo-curable epoxy resin. The developing solution is not particularly limited as long as it can dissolve and remove the resin film on the non-exposure portions, and propylene glycol monomethyl ether acetate and the like can be used when the photo-curable epoxy resin is used.

Among contact faces to display particles in the gap 18 between the substrates 11 and 12, at least the contact faces of the rib 17 to display particles have predetermined surface roughness. With this arrangement, since the adhesive strength of the display particles to the surfaces of ribs can be reduced, it becomes possible to repeatedly display images with sufficiently superior contrast between an image portion and a non-image portion for a long period of time. The present invention has been made based upon the finding that the reduction of the adhesive strength of the display particles to the contact face of the rib 17 to the display particles among the contact faces to the display particles in the gap 18 devotes to improve contrast comparatively greatly. For example, in a case where the contact face of the rib to the display particles does not have predetermined surface roughness, it is not possible to provide a sufficient contrast upon carrying out display processes repeatedly, even if, among the contact faces to the display particles in the gap 18, the surfaces on the substrate side have the predetermined surface roughness.

In FIG. 1, the rib 17 has a surface layer 171, and by providing predetermined surface roughness to the surface of the corresponding surface layer 171, the contact face of the rib 17 to the display particles is allowed to have predetermined surface roughness; however, the present invention is not intended to be limited by this structure, and for example, the surface of the rib 17 itself may have predetermined surface roughness, without forming the surface layer 171.

With respect to the surface roughness of the contact face of the rib 17 to the display particles, the arithmetic average roughness Ra is 0.01 to 0.20 μm, preferably 0.05 to 0.20 μm, and the average interval Sm of irregularities is 0.50 to 2.50 μm, preferably 1.00 to 2.00 μm. When Ra is too small, the contact areas to display particles increase to fail to effectively reduce the amount of adhesion, with the result that it is not possible to provide sufficient contrast upon carrying out display repeatedly. When Ra is too great, an electric field is applied locally to cause electrical degradation of the substrate, with the result that it is not possible to provide sufficient contrast upon carrying out display repeatedly. When Sm is too small, the contact areas to display particles increase to fail to effectively reduce the amount of adhesion, with the result that it is not possible to provide sufficient contrast upon carrying out display repeatedly. When Sm is too great, an electric field is applied locally to cause electrical degradation of the substrate, with the result that it is not possible to provide sufficient contrast upon carrying out display repeatedly.

In the present specification, Ra represents arithmetic average roughness based upon JIS B 0601-1994, and an average value of measured values obtained at arbitrary ten points by using VK-9500 (made by KEYENCE Corporation). The value of Ra is not necessarily required to be measured by the above-mentioned device, and any device may be used as long as a measurement is carried out based upon the same principle and rule as those of the above-mentioned device.

Sm represents an average interval of irregularities based upon JIS B 0601-1994, and an average value of measured values obtained at arbitrary ten points by using VK-9500 (made by KEYENCE Corporation). The value of Sm is not necessarily required to be measured by the above-mentioned device, and any device may be used as long as a measurement is carried out based upon the same principle and rule as those of the above-mentioned device.

The surface layer 171 may be formed as either an inorganic compound layer or an organic compound layer, and from the viewpoint of contrast durability, the surface layer 171 is preferably formed as an inorganic compound layer.

Examples of the inorganic compound capable of forming the surface layer 171 include metal oxides such as silicon oxide, titanium oxide and aluminum oxide; and metal nitrides such as silicon nitride and titanium nitride.

Examples of the organic compound capable of forming the surface layer 171 include polycarbonate, polyamide, polyester and polyether.

Although not particularly limited as long as an object of the present invention is achieved, the thickness of the surface layer 171 is normally 10 to 1000 nm, preferably 50 to 500 nm. The value measured by using Dektak 3030 (made by SLOAN Co., Ltd.) is used as the thickness of the surface layer.

When the inorganic compound layer is used as the surface layer 171 having predetermined surface roughness, the corresponding layer can be formed by using an atmospheric pressure plasma processing method. The Ra and Sm of the surface layer can be controlled by adjusting the amount of a material gas (surface-layer forming gas) and the amount of a reaction gas in the atmospheric pressure plasma processing method. For example, when the amount of the material gas is made greater, Ra becomes smaller, and when the amount of the material gas is made smaller, Ra becomes greater. For example, when the amount of the reaction gas is made greater, Sm becomes smaller, and when the amount of the reaction gas is made smaller, Sm becomes greater.

In the atmospheric pressure plasma processing method, under the atmospheric pressure or substantially atmospheric pressure, a gas containing a surface-layer forming gas is supplied to a plasma discharging space, and by applying a high-frequency electric field to the discharging space, the gas is excited so that by exposing a base member to the excited gas, a surface layer is formed on the base member. In this case, the base member corresponds to a substrate with ribs formed thereon of two substrates used for forming an image display element, and an electrode and/or an insulating layer may be formed thereon on demand. The rib-formation face of the substrate with ribs is exposed to the excited gas so that a predetermined surface layer may be formed at least on the contact face of the rib to display particles. By covering surfaces that are not required for forming the surface layer with a mask, the formation of the surface layer can be prevented.

Figure 3:
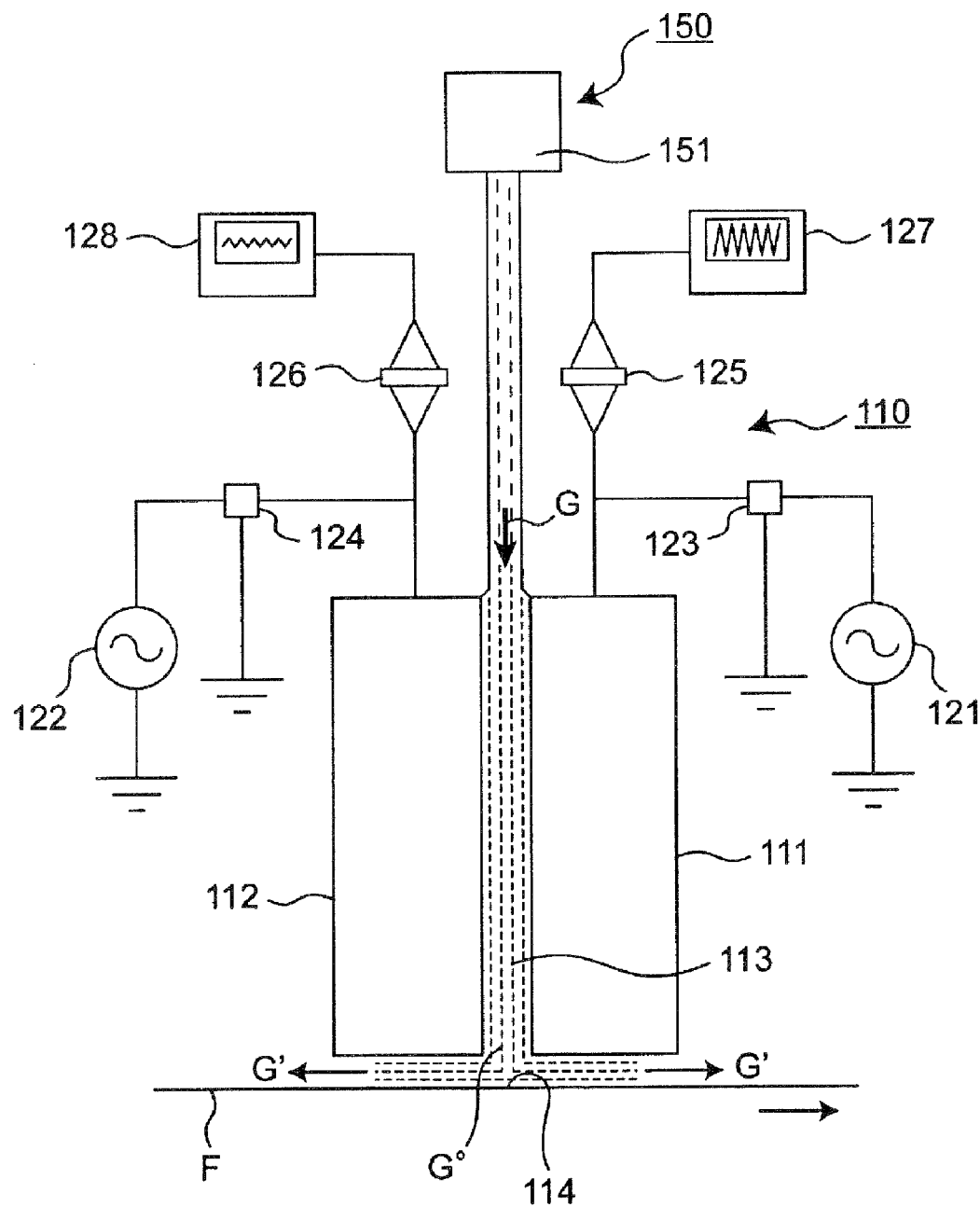
FIG. 3 is a schematic drawing that shows one example of a surface-layer manufacturing device of a jet system that is effectively used in the present invention.

Referring to FIG. 3, such an atmospheric pressure plasma processing method (hereinafter, referred to simply as a plasma processing method) will be explained in detail. FIG. 3 is a schematic drawing that shows one example of a surface layer-forming device of a jet system that employs the atmospheric pressure plasma processing method, and is effectively used in the present invention. The surface layer forming device of a jet system is a device having a plasma discharge processing device 110 and a gas supply means 150.

The plasma discharge processing device 110 is provided with opposed electrodes composed of a first electrode 111 and a second electrode 112, and between the opposed electrodes, a first high frequency electric field having a frequency $\omega_1$, an electric field intensity $V_1$ and an electric current $I_1$ from a first power supply 121 is applied from the first electrode 111 and a second high frequency electric field having a frequency $\omega_2$, an electric field intensity $V_2$ and an electric current $I_2$ from a second power supply 122 is applied from the second electrode 112. The first power supply 121 can apply a high frequency electric field intensity that is higher than that of the second power supply 122 ($V_1 > V_2$), and the first frequency of the first power supply 121 can apply a frequency lower than the second frequency $\omega_2$ of the second power supply 122.

A first filter 123 is installed between the first electrode 111 and the first power supply 121 so that an electric current is allowed to pass more easily from the first power supply 121 to the first electrode 111, while an electric current from the second power supply 122 is earthed and designed to pass with difficulty from the second power supply 122 to the first power supply 121. The expression "pass with difficulty" refers to the fact that preferably, only an electric current of 20% or less, more preferably, only an electric current of 10% or less, is allowed to pass. In contrast, the expression "pass more easily" refers to the fact that preferably, an electric current of 80% or more, more preferably, an electric current of 90% or more, is allowed to pass.

A second filter 124 is installed between the second electrode 112 and the second power supply 122 so that an electric current is allowed to pass more easily from the second power supply 122 to the second electrode 112, while an electric current from the first power supply 121 is earthed and designed to pass with difficulty from the first power supply 121 to the second power supply 122.

Upon manufacturing a surface layer, a gas G generated at a gas generation device 151 of the gas supply means 150 is introduced between opposed electrodes (discharging space) 113 of the first electrode 111 and the second electrode 112, and a high-frequency electric field is applied thereto from the first electrode 111 and the second electrode 112 to generate a discharge, while the gas G in its plasma state is blown in a jet state to the lower side (lower side of paper face) of the opposed electrodes, so that a processing space, formed by the lower face of the opposed electrodes and a base member F, is filled with a gas G° in a plasma state; thus, a predetermined surface layer is formed on the base member F in the vicinity of a processing position 114. The base member F may be set still, or may be transported. During the surface layer formation, a medium is allowed to pass through a pipe from an electrode temperature adjusting means (not shown) to heat or cool the electrodes. Depending on the temperature of the base member during the plasma discharging process, physical properties, compositions and the like of the resulting surface layer tend to be changed, and these should be desirably controlled on demand. As the medium for the temperature adjustment, an insulating material, such as distilled water and oil, is preferably used. Upon carrying out the plasma discharging process, it is preferable to uniformly adjust the temperature inside the electrode so as to minimize the variation of temperature in the base member in the width direction or in the longitudinal direction as little as possible.

The plasma discharging process is carried out under the atmospheric pressure or substantially atmospheric pressure, and the atmospheric pressure or substantially atmospheric pressure is about 20 kPa to 110 kPa, preferably 93 kPa to 104 kPa.

The discharging conditions are set so that in a discharging space, the first high-frequency electric field and the second high-frequency electric field are superposed, with the frequency $\omega_2$ of the second high-frequency electric field being made higher than the frequency $\omega_1$ of the first high-frequency electric field; and the first high-frequency electric field intensity $V_1$, the second high-frequency electric field intensity $V_2$ and a discharging initial electric field intensity IV being allowed to satisfy the following relationship:

$$V_1 \geq IV > V_2 \text{ or } V_1 > IV \geq V_2$$

while the output density of the second high-frequency electric field being 1 W/cm² or more.

The high frequency refers to a frequency of at least 0.5 kHz. When both of the high-frequency electric fields to be superposed are sine waves, the superposed component between the frequency $\omega_1$ of the first high-frequency electric field and the frequency $\omega_2$ of the second high-frequency electric field higher than the frequency $\omega_1$ is formed, and its waveform becomes a saw-shaped waveform formed by superposing, on the sine wave of the frequency $\omega_1$, the sine wave of higher frequency $\omega_2$ higher than the frequency $\omega_1$.

The intensity of the discharging initial electric field refers to the lowest electric field intensity capable of generating discharge in a discharging space (the structure or the like of the electrode) and reaction conditions (gas conditions and the like) to be used for actually forming the surface layer. The discharging initial electric field intensity is more or less fluctuated by the kind of a gas to be supplied to the discharging space, the kind of the dielectric member of the electrode, or the distance between the electrodes; however, it is dependent on the discharging initial electric field intensity of a discharge gas in the same discharge space.

In the present specification, the high-frequency electric field intensity (applied electric field intensity) and the discharging initial electric field intensity are measured by the following method.

Method for measuring high-frequency electric field intensities $V_1$ and $V_2$ (unit: kV/mm):

A high-frequency voltage probe (P6015A) is installed on each of electrodes, and the output signal of the high-frequency voltage probe is connected to an oscilloscope (TDS3012B: made by Tektronix, Inc.) so that the electric field intensity is measured.

Method for measuring discharging initial electric field intensity IV (unit: kV/mm):

A discharge gas is supplied between electrodes, and by increasing the electric field intensity between the electrodes, the electric field intensity at the time when the discharge is started is defined as a discharging initial electric intensity IV. The measuring devices are the same as those used in the high-frequency electric field intensity measurements.

FIG. 3 shows the positional relationship between the high-frequency voltage probe and the oscilloscope used for the above-mentioned measurements. In FIG. 3, reference numerals 125 and 126 represent high-frequency voltage probes, and reference numerals 127 and 128 represent oscilloscopes.

The above description has discussed superposing processes of continuous waves such as sine waves; however, the present invention is not limited thereto, and both of them may be pulse waves, or one of them may be a continuous wave, and the other may be a pulse wave. A third electric field may be prepared.

As the frequency of the first power supply 121, a frequency of 200 kHz or less is preferably used. The electric-field waveform may be a continuous wave, or a pulse wave. The lower limit is preferably about 1 kHz.

As the frequency of the second power supply 122, a frequency of 800 kHz or more is preferably used. As the frequency of the second power supply becomes higher, the plasma density becomes higher so that a surface layer having fine and high quality can be obtained. The upper limit is preferably about 200 MHz.

The electric current preferably satisfies $I_1 < I_2$. The electric current $I_1$ of the first high-frequency electric field is preferably 0.3 mA/cm² to 20 mA/cm², more preferably 1.0 mA/cm² to 20 mA/cm². In addition, the electric current $I_2$ of the second high-frequency electric field is preferably 10 mA/cm² to 100 mA/cm², more preferably 20 mA/cm² to 100 mA/cm².

As the first filter 123, capacitors of several 10 pF to several tens of thousands pF, or coils of about several μH may be used depending on the frequency of the second power supply.

As the second filter 124; coils of 10 μH or more may be used depending on the frequency of the first power supply, and grounding is provided through these coils or capacitors so that a filter can be prepared.

As the first power supply (high-frequency power supply) 121, the following commercial products are proposed, and any of these may be used.

| Application Power-Supply Symbol | Maker | Frequency | Product Name |
| --- | --- | --- | --- |
| A1 | Shinko electric Co., Ltd. | 3 kHz | SPG3-4500 |
| A2 | Shinko electric Co., Ltd. | 5 kHz | SPG5-4500 |
| A3 | Kasuga Electric Works Ltd. | 15 kHz | AGI-023 |
| A4 | Shinko electric Co., Ltd. | 50 kHz | SPG50-4500 |
| A5 | Haiden Laboratory Inc. | 100 kHz* | PHF-6k |
| A6 | Pearl Kogyo Co., Ltd. | 200 kHz | CF-2000-200k |
| A7 | Pearl Kogyo Co., Ltd. | 400 kHz | CF-2000-400k |

Furthermore, as the second power supply 122 (high-frequency power supply), the following commercial products are proposed, and any of these may be preferably used.

| Application Power-Supply Symbol | Maker | Frequency | Product Name |
|---|---|---|---|
| B1 | Peal Kogyo Co., Ltd. | 800 kHz | CF-2000-800k |
| B2 | Peal Kogyo Co., Ltd. | 2 MHz | CF-2000-2M |
| B3 | Peal Kogyo Co., Ltd. | 13.56 MHz | CF-5000-13M |
| B4 | Peal Kogyo Co., Ltd. | 27 MHz | CF-2000-27M |
| B5 | Peal Kogyo Co., Ltd. | 150 MHz | CF-2000-150M |

Additionally, among the above-mentioned power supplies, the power supply indicated by symbol* is an impulse high-frequency power supply (100 kHz in continuous mode) made by Haiden Laboratory Inc. Those power supplies other than this are high-frequency power supplies capable of applying only the continuous sine wave.

As the power to be applied between the opposed electrodes, a power (output density) of 1 W/cm$^2$ or more is supplied to the second electrode 112 (second high-frequency electric field) so that a discharge gas is excited to generate plasma and give energy to a surface layer forming gas so that a surface layer is formed. The upper limit value of the power to be supplied to the second electrode is preferably 50 W/cm$^2$, more preferably 20 W/cm$^2$. The lower limit value thereof is preferably 1.2 W/cm$^2$. Additionally, the discharge area (cm$^2$) refers to the area of a range in which discharge is generated in the electrodes.

By also supplying a power (output density) of 1 W/cm$^2$ or more to the first electrode 111 (first high-frequency electric field), it is possible to improve the output density, with the uniformity of the second high-frequency electric field being maintained. Thus, it becomes possible to generate uniform plasma with higher density, and also to simultaneously improve the film-forming rate and the film quality. Preferably, it is 5 W/cm$^2$ or more. The upper limit value of a power to be supplied to the first electrode is preferably 50 W/cm$^2$.

The electrode to be used for manufacturing a surface layer by the use of such atmospheric pressure plasma needs to withstand severe conditions from both of structural and functional points of view. As such an electrode, one obtained by coating a metallic base member with a dielectric material is preferably used.

With respect to the dielectric-material coated electrode, those having well-matched characteristics with various metallic base members and dielectric materials are preferable, and, one combination exerts a characteristic in which a difference in linear thermal expansion coefficients between the metallic base member and the dielectric material is 10×10$^{-6}$/° C. or less. Preferably, it is 8×10$^{-6}$/° C. or less, mote preferably 5×10$^{-6}$/° C. or less, even more preferably 2×10$^{-6}$/° C. or less. The linear thermal expansion coefficient refers to a physical property value inherent to a known material.

With respect to the combination between the conductive metallic base member and the dielectric member having a difference in linear thermal expansion coefficients within this range, the following combinations are proposed:
1: The metallic base member is made from pure titanium or a titanium alloy, and the dielectric member is a ceramic sprayed film.
2: The metallic base member is made of pure titanium or a titanium alloy, and the dielectric member is a glass lining film.
3: The metallic base member is made of stainless steel, and the dielectric member is a ceramic sprayed film.
4: The metallic base member is made of stainless steel, and the dielectric member is a glass lining film.
5: The metallic base member is made of a composite material of ceramics and iron, and the dielectric member is a ceramic sprayed film.
6: The metallic base member is made of a composite material of ceramics and iron, and the dielectric member is a glass lining film.
7: The metallic base member is made of a composite material of ceramics and aluminum, and the dielectric member is a ceramic sprayed film.
8: The metallic base member is made of a composite material of ceramics and aluminum and the dielectric member is a glass lining film. From the viewpoint of a difference in linear thermal expansion coefficients, the above-mentioned item 1 or 2 and items 5 to 8 are preferably used, and in particular, item 1 is more preferably used.

With respect to the characteristic required for the dielectric member, more specifically, inorganic compounds having a specific dielectric constant of 6 to 45 are preferable. Examples of such dielectric members include ceramics such as alumina and silicon nitride, or glass lining materials, such as silicate-based glass and borate-based glass. Among these, those materials formed by spraying ceramics or made by a glass lining process are preferable. In particular, a dielectric member on which alumina is sprayed process is preferably used.

As another preferable specification capable of withstanding large electric power, the thickness of the dielectric member is 0.5 to 2 mm. The variation in film thickness is desirably 5% or less, preferably 3% or less, more preferably 1% or less.

The distance between the first electrode 111 and the second electrode 112 opposed to each other refers to the shortest distance of the distance between the dielectric member surface and the surface of the conductive metallic base member of the other electrode when a dielectric member is provided on one electrode. In a case where dielectric members are provided on both of the electrodes, the distance refers to the shortest distance of the distance between the mutual dielectric member surfaces. The distance between the electrodes is determined by taking into consideration factors, such as the thickness of the dielectric member provided on the conductive metallic base member, the size of an electric-field intensity applied, the purpose of utilizing plasma and the like, and in any of these cases, from the viewpoint of carrying out a uniform discharging process, it is preferably 0.1 to 20 mm, in particular, preferably 0.5 to 2 mm.

The gas G to be supplied to the discharge space contains at least a discharge gas and a surface-layer forming gas. The discharge gas and the surface-layer forming gas may be supplied in a mixed manner, or may be supplied in a separate manner. The gas to be supplied to the discharge space may contain a reactive gas that accelerates a reaction for forming a surface layer, if necessary.

The discharge gas refers to a gas capable of generating a glow discharge that can form a surface layer. Examples of the discharge gas include nitrogen, a rare gas, air and the like, and these may be used alone as a discharge gas, or may be used in a mixed manner. In the present invention, a gas preferably used as the discharge gas is nitrogen. The nitrogen gas preferably occupies 50 to 100% by volume of the discharge gas. In this case, a rare gas of less than 50% by volume is preferably contained therein as the discharge gas other than nitrogen. The amount of the discharge gas is preferably 70 to 99.9% by volume relative to the total amount of the gas to be supplied to the discharge space.

The surface-layer forming gas refers to a raw material gas that excites itself in a discharge space to form a plasma state, and is chemically deposited on a base member to form a surface layer thereon, and this gas is selected on demand depending on the kinds of a compound to constitute the surface layer. As a material for the surface-layer forming gas, an organic metal compound which is a gas or a liquid at normal temperature, in particular, an alkyl metal compound, a metal alkoxide compound and an organic metal complex compound, is preferably used. The phase state at normal temperature under normal pressure of the material is not necessarily limited to a gaseous phase, and either the liquid phase or the solid phase may be used as long as the gas can be gasified through fusion, evaporation, sublimation or the like by a heating process or a pressure reducing process in the gas generation device 151.

As the surface-layer forming gas, for example, a silicon compound, a titanium compound, an aluminum compound and the like may be used.

Specific examples of the silicon compound include, but are mot limited to silane, tetramethoxysilane, tetraethoxysilane (TEOS), tetra-n-propoxysilane, tetraisopropoxysilane, tetra-n-butoxysilane, tetra-t-butoxysilane, dimethyldimethoxysilane, dimethyldiethoxysilane, diethyldimethoxysilane, diphenyldimethoxysilane, methyltriethoxysilane, ethyltrimethoxysilane, phenyltriethoxysilane, 3,3,3-trifluoropropyl) trimethoxysilane, hexamethyldisiloxane, bis(dimethylamino) dimethylsilane, bis(dimethylamino)methylvinylsilane, bis(ethylamino)dimethylsilane, N,O-bis(trimethylsilyl) acetoamide, bis(trimethylsilyl)carbodiimide, diethylaminotrimethylsilane, dimethylaminodimethylsilane, hexamethyldisilazane, hexamethylcyclotrisilazane, heptamethyldisilazane, nonamethyltrisilazane, octamethylcyclotetrasilazane, tetrakisdimethylaminosilane, tetraisocyanatesilane, tetramethyldisilazane, tris(dimethylamino)silane, triethoxyfluorosilane, allyldimethylsilane, allyltrimethylsilane, benzyltrimethylsilane, bis(trimethylsilyl)acetylene, 1,4-bistrimethylsilyl-1,3-butadiene, di-t-butylsilane, 1,3-disilabutane, bis(trimethylsilyl)methane, cyclopentadienyltrimethylsilane, phenyldimethylsilane, phenyltrimethylsilane, propargyltrimethylsilane, tetramethylsilane, trimethylsilylacetylene, 1-(trimethylsilyl)-1-propyne, tris(t-rimethylsilyl)methane, tris(trimethylsilyl)silane, vinyl-trimethylsilane, hexamethyldisilane, octamethylcyclotetrasiloxane, tetramethylcyclotetrasiloxane, hexamethylcyclotetrasiloxane and M silicate 51.

Specific examples of the titanium compound include, but are not limited to, organic metal compounds such as tetradimethylaminotitanium, metal hydrogen compounds such as monotitanium and dititanium, metal halogen compounds such as titanium dichloride, titanium trichloride and titanium tetrachloride, and metal alkoxides such as tetraethoxy titanium, tetraisopropoxy titanium and tetrabutoxy titanium.

Specific examples of the aluminum compound include, but are not limited to, aluminum n-butoxide, aluminum s-butoxide, aluminum t-butoxide, aluminum diisopropoxide ethylacetoacetate, aluminum ethoxide, aluminum hexafluoropentanedionate, aluminum isopropoxide, 4-pentanedionate and dimethyl aluminum chloride.

One of these materials may be used alone, or two or more kinds of these may be mixed and used.

With respect to the surface-layer forming gas, from the viewpoint of forming a uniform surface layer on a base member by using a discharge plasma process, the content thereof in the entire gas is preferably 0.01 to 10% by volume, more preferably 0.01 to 5% by volume.

Examples of the reactive gas include oxygen, ozone, hydrogen peroxide, carbon dioxide, carbon monoxide, hydrogen and ammonia, and oxygen, carbon monoxide and hydrogen are preferable, and components selected from these gases may be preferably mixed. The content thereof is preferably 0.01 to 30% by volume relative to the entire amount of the gas; thus, the reaction is accelerated so that a surface layer having fine and good quality can be formed.

As a method for applying predetermined surface roughness to the surface of the rib 17 itself without forming the surface layer 171, for example, a method for adjusting the developing time (immersing time to a developing solution) in a photolithography method can be used. For example, by shortening the developing time in the photolithography method, Ra is made greater, while Sm is made smaller. By making the developing time longer, Pa is made smaller, while Sm is made greater.

Among contact faces to display particles in the gap 18 in FIG. 1, Ra and Sm on the surface on the substrate side preferably have values within the same range as that of the contact face of the rib 17 to display particles, respectively, from the viewpoint of contrast durability.

The above-mentioned surface on the substrate side refers to a face next to a substrate among the contact faces to display particles in the gap 18, that is, a face virtually in parallel with the substrate, which includes each of faces 20a and 20b in FIG. 1 in FIGS. 1(a) and 1(b), both of the faces 20a and 20b on the substrate side do not have the same surface roughness as the predetermined surface roughness possessed by the contact face of the rib 17 to display particles, and for example, Ra may be in a range from 0.001 to 0.50 while Sm may be in a range from 0.10 to 5.00 µm. In the present invention, of the faces 20a and 20b on the substrate side, preferably, at least one of the faces on the substrate side, more preferably, at least the face 20a on the substrate side on the upstream side in the visually recognizable direction, most preferably, both of the faces are allowed to have the same predetermined surface roughness as that of the contact face of the rib 17 to display particles.

The face on the substrate side preferably having the predetermined surface roughness is different depending on the structure of an image display apparatus, and may be, for example, the surface of the insulating layer 16, the surface of the electrode 15, or the surface of the substrate 11 and/or 12. More specifically, for example, in the case of image display apparatuses shown in FIGS. 1(a) and 1(b), the surface of the insulating layer 16 corresponds to the surface on the substrate side. For example, in a case where the image display apparatus of FIG. 1(a) is not provided with the insulating layer, the surface of the electrode 13 corresponds to the surface on the substrate side. Furthermore, for example, in a case where the image display apparatus of FIG. 1(b) is not provided with the insulating layer, the surfaces of the substrate 11 and/or 12 correspond to the surfaces on the substrate side.

As a method for applying predetermined surface roughness to the faces 20a and 20b on the substrate side, method (1) may be used in which after a surface layer has been formed on the face, predetermined surface roughness is given to the surface of the surface layer, or method (2) may be used in which, without forming the surface layer, the face itself may be roughened so as to give predetermined surface roughness.

In the case of adopting method (1), the aforementioned atmospheric pressure plasma processing method may be used, and the surface layer to be formed on the faces 20a and 20b on the substrate side may be within the same range as that of the aforementioned surface layer 171 formed on the rib surface.

In the case of adopting method (2), a method in which the developing time is adjusted in the photolithography method may be used.

At least the face having predetermined surface roughness on the rib 17, more preferably, the corresponding face and the face on the substrate side are preferably subjected to a hydrophobizing treatment. With this process, a hydrophobized film is formed and the adhesive strength of display particles is further effectively reduced, and therefore the contrast durability is remarkably improved.

The hydrophobizing treatment can be achieved through processes in which a predetermined face is heated, with a hydrophobizing agent or its solution being made in contact therewith, and then dried.

As the hydrophobizing agent, known hydrophobizing agents, which have been conventionally used as a hydrophobizing agent for inorganic fine particles to be externally added to toner particles in the field of a toner for electrophotograph, may be used. Examples of the hydrophobizing agent include a silane coupling agent and silicone oil.

Specific examples of the silane coupling agent include dimethyldichlorosilane, hexamethyldisilazane, methacrylsilane, and octylsilane.

Specific examples of the silicone oil include methylhydrogen silicone oil, carbinol-modified silicone oil and epoxy-modified silicone oil. As the silicone oil, commercially available products, such as KF-99, X-22-4.039, KF-101, X-22-170BX (made by Shin-Etsu Chemical Co., Ltd.), FZ-3704, SF8411FLUID (made by Dow Corning Toray Co., Ltd.), may be used.

Normally, during the hydrophobizing treatment, the heating temperature is preferably 50 to 150° C. and the heating time are preferably 0.5 to 20 hours.

The concentration of the hydrophobizing agent in a processing solution is preferably 50% by volume or more.

A solvent to be contained in the processing solution is not particularly limited, and an organic solvent can be used. Examples of such an organic solvent include tetrahydrofran, acetone, MEK, cyclohexanone and toluene.

The following description will explain behaviors of display particles in the gap 18 of the image display apparatus 10.

In the image display apparatus relating to the present invention, upon application of a voltage between the two substrates so that an electric field is formed therein, charged display particles located between the substrates are allowed to move in the electric field direction. In this manner, by applying a voltage between the substrates where the display particles are located, the charged display particles are allowed to move between the substrates so that an image display is carried out.

The image display in the image display apparatus of the present invention is carried out through the following sequence of processes:

(1) Display particles to be used for display media are charged by using a known method, such as frictional charging with a carrier, so that charged display particles are prepared.

(2) The charged display particles are sealed between two opposed substrates, and in this state, a voltage is applied between the substrates.

(3) By the voltage application between the substrates, an electric field is formed between the substrates.

(4) The charged display particles are attracted toward the substrate surfaces in the electric field direction by Coulomb force so that the charged display particles are moved to carry out an image display.

(5) By changing the electric field direction between the substrates, the moving directions of the charged display particles are switched. By switching the moving directions, it is possible to change the image display in various ways.

As a charging method of display particles according to the above-mentioned known method, for example, a method is proposed in which display particles are made in contact with a carrier so as to charge the display particles by frictional charging, and another method is proposed in which display particles of two colors having different charging properties are mixed and stirred in a shaker so that the display particles are charged by frictional charging among the particles.

Figure 4:
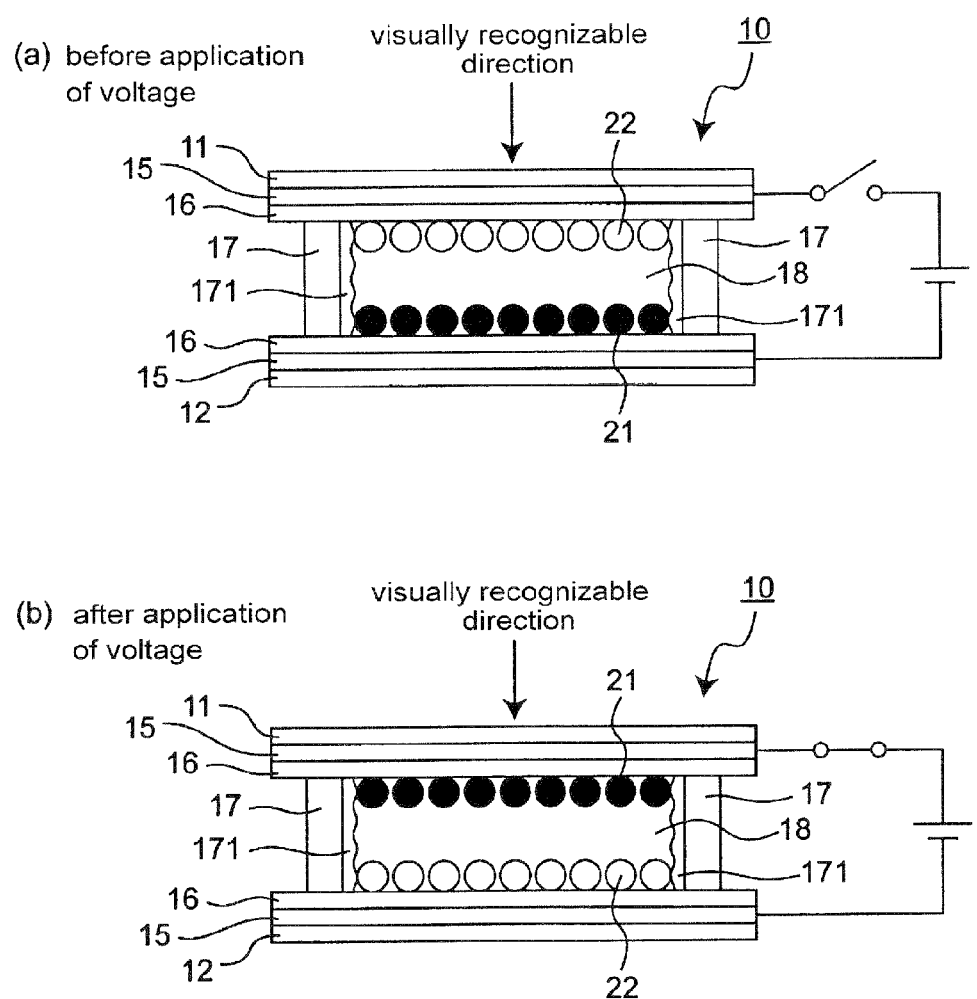
FIG. 4 is a schematic drawing that shows an example of movements of display particles caused by a voltage application between substrates.

FIGS. 4 and 5 show examples of movements of display particles in response to a voltage application between substrates.

FIG. 4(a) shows a state prior to a voltage application between substrates 11 and 12, and prior to the voltage application, white particles 22 positively charged are located in the vicinity of the substrate 11 on the visible side. This state shows that an image display apparatus 10 displays a white image. FIG. 4(b) shows a state after the application of voltage to an electrode 15. Black particles 21, negatively charged by the voltage application, have been moved in the vicinity of the substrate 11 on the visible side, while the white particles 22 have been moved to the substrate 12 side. In this state, the image display apparatus 10 displays a black image.

FIG. 5 shows a structure in which the image display apparatus 10 shown in FIG. 1 (b) of a type without electrodes is connected to a voltage application device 30, and a state prior to an application of a voltage in this state (FIG. 5(a)) and a state after the application of the voltage (FIG. 5(b)). The image display apparatus 10 of the type shown in FIG. 5(b) is similar to the image display apparatus 10 having the electrode 15. By applying voltage, black particles 21, negatively charged have been moved in the vicinity of a substrate 11 on the visible side, while white particles 22 positively charged have been moved to a substrate 12 side.

The following description will explain substrates 11 and 12, an electrode 15, an insulating layer 16 and display particles (black particles 21 and white particles 22), that constitute the image display apparatus 10 shown in FIG. 1.

First, the substrates 11 and 12 constituting the image display apparatus 10 will be described. In the image display apparatus 10, since a viewer visually recognizes an image formed by display particles from at least one of the sides of the substrates 11 and 12, the substrate to be provided on the visible side by the viewer needs to be formed by a transparent material. Therefore, the substrate to be used on the image visible side by the viewer is preferably formed by a light-transmitting material having a visible light transmittance of 80% or more, and the visible light transmittance of 80% or more makes it possible to provide sufficient visibility. Of the substrates constituting the image display apparatus 10, the substrate be placed on the side opposite to the image visible side is not necessarily required to be made of a transparent material.

The thicknesses of the substrates 11 and 12 are preferably 2 μm to 5 mm, more preferably 5 μm to 2 mm, respectively. When the thicknesses of the substrates 11 and 12 are within the above-mentioned range, it is possible to allow the image display apparatus 10 to have sufficient strength and the gap between the substrates can be uniformly maintained. By making the thicknesses of the substrates within the above-mentioned range, a compact, light-weight image display apparatus can be provided so that an application of the image display apparatus can be promoted in a wider field. In addition by making the thickness of the substrate on the image visible side within the above-mentioned range, it is possible to provide accurate visual recognition of a display image and consequently to prevent problems with display quality.

As the material having a visible light transmittance of 80% or more, examples thereof include an inorganic material, such as glass and quartz, having no flexibility, an organic material typically represented by a resin material, which will be described later, and a metal sheet. Among these, the organic material and the metal sheet allow the image display apparatus to have a certain degree of flexibility. As the resin material capable of providing a visible light transmittance of 80% or more, for example, polyester resins, typically represented by polyethylene terephthalate and polyethylene naphthalate, polycarbonate resins, polyethersulfone resins, polyimide resins and the like may be used. Acrylic resins that are polymers of acrylic acid esters and methacrylic acid esters, typically represented by polymethyl methacrylate (PMMA), and transparent resins obtained by radical-polymerizing a vinyl-based polymerizable monomer such as polyethylene resins, may be used.

The electrodes 15 are provided on the surfaces of the substrates 11 and 12, and used for forming an electric field between the substrates, that is, in the gap 18, by applying a voltage. In the same manner as in the aforementioned substrates, the electrode 15 to be formed on the image visible side to the viewer needs to be formed by using a transparent material.

The thickness of the electrode to be provided on the image visible side needs to be set to such a level as to ensure conductivity and also to avoid problems with light-transmitting property, and more specifically, it is preferably 3 nm to 1 μm, more preferably 5 nm to 400 nm. The visible light transmittance of the electrode to be provided on the image visible side is preferably 80% or more, in the same manner as that of the substrate. The thickness of the electrode to be provided on the side opposite to the image visible side is preferably within the above-mentioned range, but is not necessarily required to be made from a transparent material.

As a constituent material for the electrodes 15, examples thereof include: a metal material and a conductive metal oxide, or a conductive polymer material. Specific examples of the metal material include: aluminum, silver, nickel, copper, gold and the like, and specific examples of the conductive metal oxide include: indium-tin oxide (ITO), indium oxide, antimony-tin oxide (ATO), tin oxide, zinc oxide and the like. Examples of the conductive polymer material include: polyaniline, polypyrrole, polythiophene, polyacetylene, and the like.

As a method for forming the electrode 15 on the substrates 11 and 12, for example, in the case of forming a thin film electrode, a sputtering method, a vacuum vapor deposition method, a chemical vapor deposition method (CVD method) and a coating method are proposed. Another method may be proposed in which a conductive material is mixed with a solvent and a binder resin and this mixture is applied to a substrate so as to form an electrode.

The insulating layer 16 is not necessarily required to be formed. In the present invention, from the viewpoint of further improving the initial contrast and contrast stability, the insulating layer is preferably formed.

As a material for forming the insulating layer 16, a material that has an electrical insulating property, can be formed into a thin film, and has a transparent property, if necessary, is preferably used. The insulating layer to be formed on the image visible side is preferably designed to have a visible light transmittance of 80% or more in the same manner as in the substrate. Specific examples thereof include: polyamide resins, silicone resins, epoxy resins, polyester resins, polycarbonate resins and acrylic resins.

The thickness of the insulating layer 16 is preferably 0.01 μm or more to 10.0 μm or less. That is, when the thickness of the insulating layer 16 is within the above-mentioned range, it is possible to move the display particles 21, 22 without a necessity of applying so high a voltage between the electrodes, and this structure is preferable because, for example, an image display can be carried out by applying a voltage in such a level as to be applied during an image forming process by the use of an electrophoretic method.

The display particles include positively chargeable display particles and negatively chargeable display particles. More specifically, those display particles that exert positive chargeability and those display particles that exert negative chargeability, when made in contact with one another in a mixing process, or when made in frictional contact with a reference material such as iron powder (carrier) or the like serving as a charge imparting material, are used. Those display particles are normally different from each other not only in charging polarities, but also in colors; therefore, upon generation of an electric field between substrates in an image display apparatus, a display image can be visually recognizable based upon a difference in colors between those display particles that are moved toward the substrate on the upstream side in the visually recognizable direction and allowed to adhere thereto and those display particles that are moved toward the substrate on the downstream side in the visually recognizable direction and allowed to remain and adhere thereto. For example, one kind of positively chargeable display particles and negatively chargeable display particles may be colored into white, while the other kind thereof may be colored into black, and black particles 21 and white particles 22 in this case are shown in the above-mentioned drawing.

Normally, the positively chargeable display particles and the negatively chargeable display particles are respectively formed by externally adding external additives to base particles. In the present specification, when simply referred to as "display particles", those particles inclusively mean positively chargeable display particles and negatively chargeable display particles.

The base particles are colored resin particles that contain at least a resin and a colorant, and can further contain additives, such as a charge-controlling agent and a fluorescent whitening agent, if necessary. With respect to the base particles, normally, colorants having different colors are contained between those base particles contained in the positively chargeable display particles and those base particles contained in the negatively chargeable display particles. For example, white base particles and black base particles are used in combination.

The resin for forming base particles is not particularly limited, and typically includes a polymer referred to as a vinyl-based resin, as shown, below, and in addition to the vinyl-based resin, for example, a condensation resin such as a polyamide resin, a polyester resin, a polycarbonate resin and an epoxy resin may be exemplified. Specific examples of the vinyl-based resin include a polyolefin resin formed by an ethylene monomer and a propylene monomer, in addition to a polystyrene resin, a polyacrylic resin and polymethacrylic resin. As resins other than the vinyl-based resin, in addition to the above-mentioned condensation resin, for example, a polyether resin, a polysulfone resin, a polyurethane resin, a fluorine-based resin and a silicone-based resin may be exemplified.

As the polymer for constituting the resin that can be used for forming the base particles, in addition to those obtained by using at least one kind of polymerizable monomers forming these resins, a plurality of kinds of polymerizable monomers may be combined and used for manufacturing the polymer. Upon manufacturing a resin by combining a plurality of kinds of polymerizable monomers with one another, in addition to methods in which a copolymer, such as a block copolymer, a graft copolymer and a random copolymer, is formed, a polymer blending method in which a plurality of kinds of resins are mixed with one another may be used. By selecting a resin, the charging polarity of the display particles may be controlled.

As the colorant, it is not particularly limited, and known pigments in the field of a toner for electro photograph may be used. Among these, as a white pigment for constituting the white base particles, for example, zinc oxide (zinc white), titanium oxide, antimony white, zinc sulfide, barium titanate, calcium titanate and strontium titanate may be exemplified, and among these, titanium oxide is preferable. As a black pigment for constituting the black base particles, for example, carbon black, copper oxide, manganese dioxide, aniline black and activated carbon may be exemplified, and among these, carbon black is preferable. Although not particularly limited, the content of the colorant is, for example, 1 to 200 parts by weight relative to 100 parts by weight of the resin.

As the charge-controlling agent, it is not particularly limited, and known charge-controlling agents in the field of a toner for electrophotograph may be used. Among these, base particles containing a negative charge-controlling agent such as a salicylic acid metal complex, a metal-containing azo dye, a quarternary ammonium salt compound, and a nitroimidazole derivative tend to be negatively charged. Base particles containing a positive charge-controlling agent such as a nigrosine-based dye, a triphenylmethane compound and an imidazole derivative tend to be positively charged. Although not particularly limited, the content of the charge-controlling agent is, for example, 0.1 to 10 parts by weight relative to 100 parts by weight of the resin.

As a method for manufacturing base particles, it is not particularly limited, and known methods for manufacturing particles containing a resin and a colorant, such as a method for manufacturing a toner to be used for image formation in an electrophotograchic system, may be adopted and used. As a specific method for manufacturing base particles, for example, the following methods may be exemplified.

(1) A method in which after kneading a resin and a colorant, the resulting matter is subjected to respective pulverizing and classifying processes so that base particles are produced;
(2) A so-called suspension polymerization method in which a polymerizable monomer and a colorant are mechanically stirred in an aqueous medium to form droplets, and the droplets are then subjected to a polymerizing process to produce base particles;
(3) A so-called emulsion polymerization aggregation method in which a polymerizable monomer is dropped into an aqueous medium containing a surfactant, and after the resultant has been subjected to a polymerizing reaction in a micelle so that polymer particles having a size of 100 to 150 nm are formed, and after adding colorant particles and an aggregation agent thereto, these particles are then aggregated and fused so that base particles are produced.

As the external additives, inorganic fine particles and resin fine particles may be used.

As the inorganic fine particles, known inorganic fine particles that have been conventionally used as external additives in the field of a toner for electrophotograph, may be used, and examples thereof include metal oxides, such as silicon oxide, titanium oxide, aluminum oxide, tin oxide, zirconium oxide and tungsten oxide; nitrides, such as titanium nitride; and titanium compounds. From the viewpoint of improving flowability and environmental stability, the inorganic fine particles are preferably allowed to have hydrophobicity. The hydrophobicity can be imparted by subjecting the inorganic fine particles to a surface treatment with a surface treating agent, such as an aminosilane coupling agent.

As the resin fine particles, known resin fine particles that have been conventionally used as external additives in the field of a toner for electrophotograph may be used, and for example, fine particles made from resins that have been exemplified as resins for constituting the base particles may be used.

The average primary particle size of the external additives is normally 5 to 250 nm, and from the viewpoint of imparting a charging property and improving flowability, those having an average primary particle size of 5 nm to 100 nm are preferably used, or those having an average primary particle size of 5 to 100 nm and those having an average primary particle size of 30 nm to 250 nm are preferably used in combination. With this arrangement, it is possible to adjust the charging property of display particles and improve the flowability thereof, and since the adhesive strength of the display particles to a substrate or the like is reduced, it becomes possible to reduce a driving voltage and a variation in density and consequently to further improve contrast.

From the viewpoints of adjusting the charging property and improving the flowability, the content of the external additives is 0.1 to 50 parts by weight, in particular, preferably 1 to 20 parts by weight, relative to 100 parts by weight of the base particles. Two or more kinds of the external additives may be used in combination, and in such a case, the total amount thereof is preferably within the above-mentioned range.

The volume average particle size D of the display particles is 1 to 50 μm, and from the viewpoints of easiness of movement for an electric field and reduction of a variation in density, it is preferably 5 to 20 μm. Supposing that the total display particles including the positively chargeable display particles and negatively chargeable display particles have a volume average particle size D, the corresponding value may be within the above-mentioned range. The volume average particle size of the display particles normally has the same value as that of the base particles.

The volume average particle size D of the display particles corresponds to a so-called volume reference median diameter (d50 diameter), and can be measured and calculated by using a device in which Multisizer 3 (made by Beckman Coulter, Inc.) is connected to a computer system for use in data processing.

The measuring sequence includes processes in which, after a sample (0.02 g) has been added to and kneaded in 20 ml of a surfactant solution (used for dispersing particles, and formed as a surfactant solution by diluting a neutral detergent containing the surfactant component with pure water ten times as much), the resulting solution is subjected to an ultrasonic dispersing process for 1 minute so that a dispersion solution is prepared. This dispersion solution is injected into a beaker containing ISOTON II (made by Beckman Coulter, Inc.) inside a sample stand by using a pipette until it has reached a measured concentration of 10%, and by setting a measuring machine count to 2500 pieces, a measuring process is carried out. Additionally, the Multisizer 3 having an aperture diameter of 50 μm is used.

An image display apparatus can be manufactured by using, for example, an electrophotographic developing system as described below.

Figure 6:
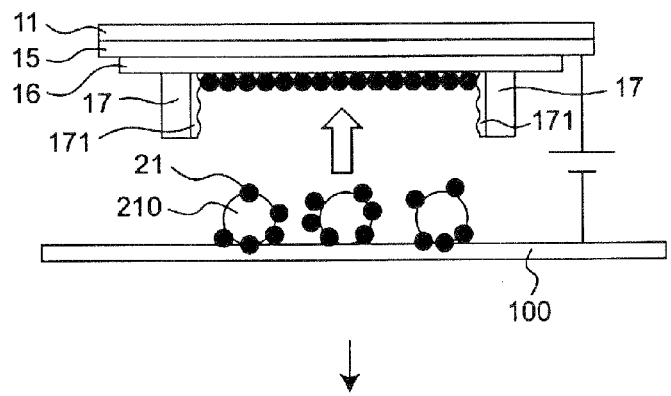
FIG. 6 is a schematic drawing that shows one example of a manufacturing method for an image display apparatus.
Figure 6:
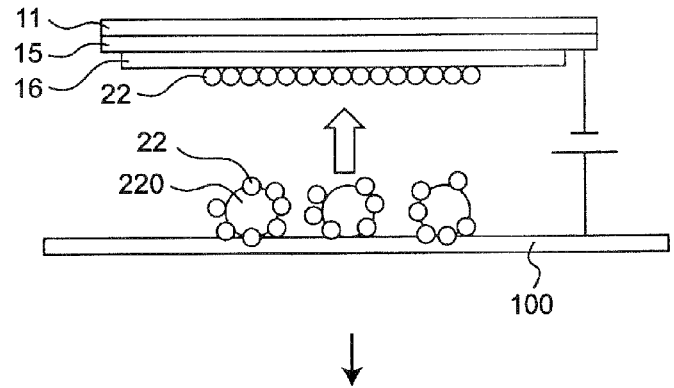
Figure 6:
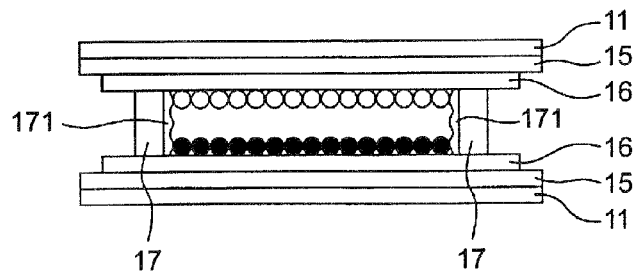

An electrode 15 and an insulating layer 16 are formed on each of substrates 11 and 12 so that a pair of substrates with electrodes formed thereon are obtained. A rib 17 is formed on the insulating layers 16 of the substrate 12 with electrodes by using the aforementioned method. A surface layer 171 having predetermined surface roughness is formed at least on the surface of the rib 17 by using the aforementioned atmospheric pressure plasma processing method. By mixing display particles 21 and a carrier 210, the display particles 21 are negatively charged and mixtures (21, 210) are placed on a conductive stage 100 as shown in FIG. 6(a), and the substrate 12 with electrodes and ribs is placed with a predetermined distance being set from the stage 100. As shown in FIG. 6(a), a DC current and an AC current having a positive polarity are applied to the electrode 15 so that negatively chargeable display particles 21 are allowed to adhere onto the insulating layer 16.

By mixing display particles 22 and a carrier 220, the display particles 22 are positively charged, mixtures (22, 220) are placed on a conductive stage 100, as shown in FIG. 6(b), and the other substrate 11 with electrodes is placed with a predetermined distance being set from the stage 100. As shown in FIG. 6(b), a DC voltage and an AC voltage having a negative polarity are applied to the electrode 15 so that positively chargeable display particles 22 are allowed to adhere onto the insulating layer 16. The substrate 12 with electrodes and ribs to which the negatively chargeable display particles are allowed to adhere and the substrate 11 with electrodes to which the positively chargeable display particles are allowed to adhere are superposed as shown in FIG. 6(c) by adjusting the ribs so as to form a predetermined interval, and the peripheral portions thereof are bonded so that an image displaying apparatus can be obtained.

The volume fraction of the display particles within a gap 18 is 5% to 70%, preferably 10% to 60%. By making the volume fraction of the display particles within the above-mentioned range, the display particles are allowed to smoothly move within the gap 18 so that an image with good contrast can be obtained.

The content rates of the positively chargeable display particles and the negatively chargeable display particles are not particularly limited as long as an object of the present invention can be achieved, and normally, the content rates are substantially the same value.

EXAMPLE

Example 1

Production of White Display Particles

The following resin and titanium oxide were loaded into a Henschel mixer (made by Mitsui-Miike Machinery Co., Ltd.) and a peripheral speed of stirring blades was set to 25 m/s so that a mixing process was carried out for five minutes to provide a mixture.

| | |
|---|---|
| Styrene acrylic resin (weight average molecular weight 20,000) | 100 parts by weight |
| Anatase-type titanium oxide (average primary particle size 150 nm) | 30 parts by weight |

The above-mentioned mixture was kneaded by a twin-screw extrusion kneader, and coarsely pulverized by a hummer mill, and then subjected to a pulverizing process by a turbo-mill pulverizer (made by Turbo Kogyo Co., Ltd.), and further subjected to a fine-particle classifying process by a gas-flow classifier utilizing the Coanda effect so that white particles (base particles) having a volume-average particle size of 10.0 μm were manufactured. Next, 0.6 parts by weight of silica fine particles (average primary particle size 50 nm) that had been subjected to an amino silane-coupling treatment were added to 100 parts by weight of the white particles, and by utilizing a Hybridizer (made by Nara Machinery Co., Ltd.) with its revolution number being set to 15,000 rpm, the resulting particles are subjected to a mixing process for 10 minutes. To these was successively added 1.0 part by weight of silica fine particles having an average primary particle size of 15 nm that had been subjected to an amino coupling treatment, and then subjected to the same processes as described above so that white display particles were manufactured.

Production of Black Display Particles

The following resin and carbon black were loaded into a Henschel mixer (made by Mitsui-Miike Machinery Co., Ltd.), and a peripheral speed of stirring blades was set to 25 m/s so that a mixing process was carried out for 5 minutes to produce a mixture.

| | |
|---|---|
| Styrene acrylic resin (weight average molecular weight 20,000) | 100 parts by weight |
| Carbon black (average primary particle size 25 nm) | 10 parts by weight |

The above-mentioned mixture was kneaded by a twin-screw extrusion kneader, and coarsely pulverized by a hummer mill, and then subjected to a pulverizing process by a turbo-mill pulverizer (made by Turbo Kogyo Co., Ltd.), and further subjected to a fine-particle classifying process by a gas-flow classifier utilizing the Coanda effect so that black particles (base particles) having a volume-average particle size of 10.0 μm were manufactured. Next, 0.6 parts by weight of silica fine particles (average primary particle size 50 nm) that had been subjected to an amino silane-coupling treatment were added to 100 parts by weight of the black particles, and by utilizing a Hybridizer (made by Nara Machinery Co., Ltd.) with its revolution number being set to 15,000 rpm, the resulting particles are subjected to a mixing process for 10 minutes. To these was successively added 1.0 part by weight of silica fine particles having an average primary particle size of 15 nm that had been subjected to an amino coupling treatment, and then subjected to the same processes as described above so that black display particles were manufactured.

Carrier a for Charging White Display Particles

To 100 parts by weight of ferrite cores having an average particle size of 80 μm was added 2 parts of fluorinated acrylate resin particles, and these materials were charged into a horizontal rotation blade type mixer, and mixed and stirred at 22° C. for 10 minutes under a condition of 8 m/sec in the peripheral speed of horizontal rotation blades, and the resulting mixture was then heated to 90° C., and stirred for 40 minutes so that carrier A was prepared.

Carrier B for Charging Black Display Particles

To 100 parts by weight of ferrite cores having an average particle size of 80 μm was added 2 parts of cyclohexyl-methacrylate resin particles, and these materials were charged into a horizontal rotation blade type mixer, and mixed and stirred at 22° C. for 10 minutes under a condition of 8 m/sec in the peripheral speed of horizontal rotation blades, and the resulting mixture was then heated to 90° C., and stirred for 40 minutes so that carrier B was prepared.

Production of Image Display Apparatus

An image display apparatus was manufactured in accordance with the following method so as to have the same structure as that of FIG. 1(a) except that no insulating layer 16 was formed.

Figure 2:
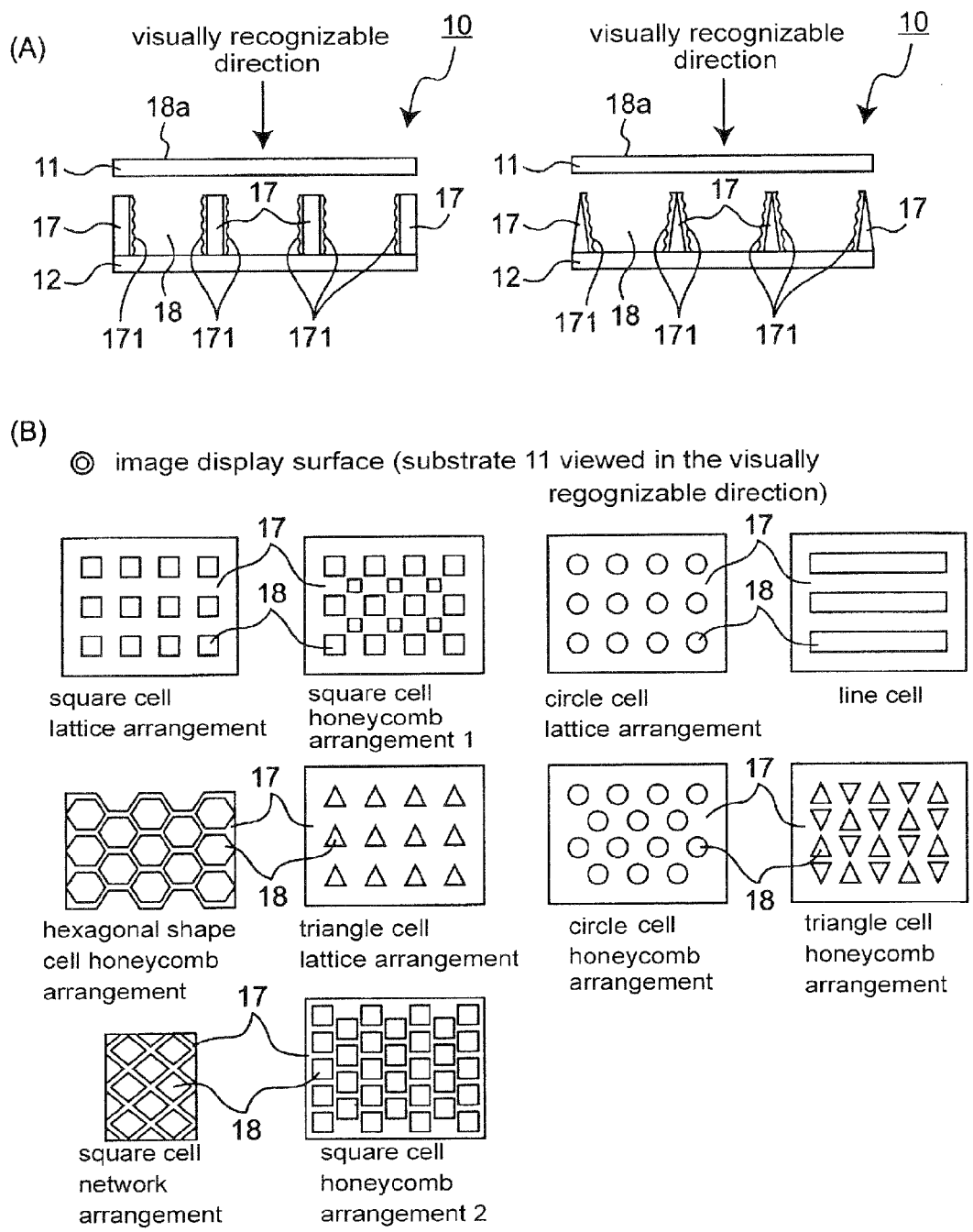
FIG. 2 is a schematic cross-sectional view that shows structural examples of ribs and cells and a schematic sketch drawing that shows an image display surface.

Of a pair of glass substrates (7 cm×7 cm) having an electrode of an indium-tin oxide film (ITO: thickness 50 nm) formed thereon, a photocurable epoxy resin solution was applied on the electrode of one of the substrates by using a spin coater so that a dried film thickness of 50 μm was prepared. Thereafter, a lattice-shaped photomask (lattice interval=100 μm, lattice width=10 μm) was placed on the epoxy resin film, and it was exposed at a predetermined exposure amount (i-ray=20 mW, 300 mJ) by using an exposure machine. It was further immersed in a developing solution for 5 minutes so that the epoxy resin of the non-exposed portion was removed; thus, ribs having 100 μm in lattice interval, 10 μm in lattice width and 50 μm in lattice height were formed. When the substrate with such ribs formed thereon was viewed from the visually recognizable direction, for example, as shown in FIG. 2, cells, each having a square shape, were arranged in a lattice shape.

The rib formation face of the substrate with electrodes having ribs formed thereon was subjected to an atmospheric pressure plasma process. More specifically, by using a surface-layer forming device shown in FIG. 3, a silicon oxide layer was formed on the contact face of the rib to display particles and an electrode-exposed face so that irregularities were prepared thereon. At this time, as a dielectric member for coating each electrode of the surface-layer forming device, those members having both of the opposed electrodes coated with alumina having a thickness of 1 mm in its thickness on one side by a ceramic spraying process were used. The gap of the electrodes after the coating process was set to 1 mm. A metal base member coated with the dielectric member was a stainless jacket type having a cooling function by cooling water, and during a discharging process, the plasma process was carried out while controlling the electrode temperature by the cooling water.

Film forming conditions are shown below. Each of material gases was heated so as to generate its vapor, and mixed and diluted with a discharge gas and a reaction gas that were preliminarily allowed to have residual heat so that the materials were not aggregated, and the mixed gas was supplied to a discharge space so that "a substrate A1 with ribs" was obtained. Ra and Sm were measured on the contact face of the rib surface of the substrate with ribs to display particles as well as on the electrode exposed-face of the substrate with ribs.

(Forming Conditions of Irregularities)
Discharge gas: $N_2$ gas
Reaction gas: 19% by volume of $O_2$ gas relative to all the gases.
Material gas: 1.4% by volume of tetraethoxysilane (TEOS) relative to all the gases
Film thickness: 50 nm
Power-supply power on low frequency side (high-frequency power supply made by Shinko electric Co., Ltd. (50 kHz)): 10 W/cm$^2$
Power-supply power on high frequency side (high-frequency power supply made by Pearl Kogyo Co., Ltd. (13.56 MHz)): 5 W/cm$^2$ A substrate with electrodes and without ribs formed thereon was used as "a substrate B," as it was, without being subjected to an atmospheric pressure plasma process. In this case, Ra was 0.001 μm, and Sm was 4.21 μm on the electrode exposure face of the substrate B.

Black display particles (1 g) and carrier B (9 g) were mixed by a shaker (YS-LD, made by Yayoi Co., Ltd.) for 30 minutes so that the display particles were charged. The resulting mixtures (21, 210) were put on a conductive stage 100, as shown in FIG. 6(a), and the substrate A1 with ribs was disposed with a gap of about 2 mm being set from the stage 100. Between the electrode 15 and the stage 100, a DC bias of +50V and an AC bias of 2.0 kV with a frequency of 2.0 kHz were applied for 10 seconds so that negatively chargeable black display particles 21 were allowed to adhere to the substrate side. In the example, no insulating layer 16 was formed in FIGS. 6(a) to 6(c).

White display particles (1 g) and carrier. A (9 g) were mixed by a shaker (YS-LD, made by Yayoi Co., Ltd.) for 30 minutes so that the display particles were charged. The resulting mixtures (22, 220) were put on a conductive stage 100, as shown in FIG. 6(b), and the substrate B was disposed with a gap of about 2 mm being set from the stage 100. Between the electrode 15 and the stage 100, a DC bias of −50V and an AC bias of 2.0 kV with a frequency of 2.0 kHz were applied for 10 seconds so that positively chargeable white display particles 22 were allowed to adhere to the substrate side.

As shown in FIG. 6(c), the substrate A1 with ribs to which the black display particles were adhered and the substrate B to which the white display particles were adhered were superposed so as to have a gap of 50 μm by making adjustments by ribs, and the peripheral portions of the substrates were bonded to each other with an epoxy based adhesive so that an image display apparatus was prepared. Additionally, the mixing rates of the white display particles and the black display particles were adjusted so as to have the same weight respectively, and the volume-filling ratio of the display particles between the glass substrates were adjusted so as to be 50%.

Example 2

An image display apparatus was manufactured by using the same method as that of Example 1, except that in place of the substrate A1 with ribs, a substrate A2 with ribs that had been subjected to a hydrophobizing treatment by using the following method was used.

To a 1-liter round separable flask was loaded 300 mL of hexamethyl disilazane, and the substrate A1 with ribs was immersed in the solution. The flask was plugged with a three-necked separable cover, and a cooling pipe was attached thereto, and this was subjected to a treatment at 50° C. for 4 hours under a nitrogen gas flow. After the treatment, the resulting substrate was washed with methanol, and dried at 100° C. for 2 hours so that "a substrate A2 with ribs" was obtained.

Example 3

An image display apparatus was manufactured by using the same method as that of Example 1, except that in place the substrate A1 with ribs, a substrate A3 with ribs obtained by the following method was used.

"A substrate A3 with ribs" was obtained by using the same method as the manufacturing method for the substrate A1 with ribs, except that the film forming conditions were altered as shown below.

Forming Conditions of Irregularities
Discharge gas: $N_2$ gas
Reaction gas: 19% by volume of $O_2$ gas relative to all the gases.

Material gas: 1.9% by volume of tetraethoxysilane (TEOS) relative to all the gases
Film thickness: 65 nm
Power-supply power on low frequency side (high-frequency power supply made by Shinko electric Co., Ltd. (50 kHz)): 10 W/cm$^2$
Power-supply power on high frequency side (high-frequency power supply made by Pearl Kogyo Co., Ltd. (13.56 MHz)): 5 W/cm$^2$ Example 4

An image display apparatus was manufactured by using the same method as that of Example 1, except that in place of the substrate A1 with ribs, a substrate A4 with ribs that had been subjected to a hydrophobizing treatment by using the following method was used.

To a 1-liter round separable flask was loaded 300 mL of hexamethyl disilazane, and the substrate A3 with ribs was immersed in the solution. The flask was plugged with a three-necked separable cover, and a cooling pipe was attached thereto, and this was subjected to a treatment at 50° C. for 4 hours under a nitrogen gas flow. After the treatment, the resulting substrate was washed with methanol, and dried at 100° C. for 2 hours so that "a substrate A4 with ribs" was obtained.

Example 5

An image display apparatus was manufactured by using the same method as that of Example 1, except that in place of the substrate A1 with ribs, a substrate A5 with ribs obtained by the following method was used.

"A substrate A5 with ribs" was obtained by using the same method as the manufacturing method for the substrate A1 with ribs, except that by coating the electrode exposed face with a mask, a silicon oxide layer was formed only on the contact face of the rib to display particles so as to provide irregularities.

Example 6

An image display apparatus was manufactured by using the same method as that of Example 1, except that in place of the substrate A1 with ribs, a substrate A6 with ribs obtained by the following method was used.

"A substrate A6 with ribs" was obtained by using the same method as the manufacturing method of Example 1 except that the immersing time to a developing solution upon forming ribs was made one minute and that no atmospheric pressure plasma process was carried out.

Comparative Example 1

An image display apparatus was manufactured by using the same method as that of Example 1, except that in place of the substrate A1 with ribs, a substrate X1 with ribs obtained by the following method was used and that in place of the substrate B, a substrate Y1 obtained by the following method was used.

Of a pair of glass substrates (7 cm×7 cm) each having an electrode of an indium-tin oxide film (ITO: thickness 50 nm) formed thereon, hexamethyldisilazane was applied on the electrode of one of the substrates by using a spin coater at 2000 rpm, and it was dried at 100° C. for 30 Minutes so that a hydrophobized film was formed. On such a hydrophobized film, lattice-shaped ribs were formed by using the same method as that of Example 1 so that a substrate X1 with ribs was obtained. No atmospheric pressure plasma process was carried out.

Hexamethyldisilazane was applied on the electrode of the other substrate by using a spin coater at 2000 rpm, and it was dried at 100° C. for 30 minutes so that a hydrophobized film was formed; thus, a substrate Y1 was obtained. In this case, Ra was 0.005 μm, and Sm was 4.06 μm on the surface of the hydrophobized film of the substrate Y1.

Comparative Example 2

An image display apparatus was manufactured by using the same method as that of Example 1, except that in place of the substrate A1 with ribs, "a substrate X2 with ribs" obtained by the following method was used.

By using the same method as the manufacturing method for the substrate A1 with ribs, except that by coating the rib surface with a mask, a silicon oxide layer was formed only on the electrode-exposed face so as to provide irregularities so that "a substrate X2 with ribs" was obtained.

Comparative Examples 3 to 6

An image display apparatus was manufactured by using the same method as that of Example 1, except that in place of the substrate A1 with ribs, each of substrates X3 to X6 with ribs obtained by the following method was used.

"A substrate X3 with ribs" was obtained by using the same method as the manufacturing method for the substrate A1 with ribs, except that the film-forming conditions were altered as shown below.
(Forming Conditions of Irregularities)
Discharge gas: N$_2$ gas
Reaction gas: 19% by volume of O$_2$ gas relative to all the gases.
Material gas: 0.005% by volume of tetraethoxysilane (TEOS) relative to all the gases
Film thickness: 65 nm
Power-supply power on low frequency side (high-frequency power supply made by Shinko electric Co., Ltd. (50 kHz)): 10 W/cm$^2$
Power-supply power on high frequency side (high-frequency power supply made by Pearl Kogyo Co., Ltd. (13.56 MHz)): 5 W/cm$^2$ "A substrate X4 with ribs" was obtained by using the same method as the manufacturing method for the substrate A1 with ribs, except that the film-forming conditions were altered as shown below.
(Forming Conditions of Irregularities)
Discharge gas: N$_2$ gas
Reaction gas: 19% by volume of O$_2$ gas relative to all the gases.
Material gas: 5.1% by volume of tetraethoxysilane (TEOS) relative to all the gases
Film thickness: 65 nm
Power-supply power on low frequency side (high-frequency power supply made by Shinko electric Co., Ltd. (50 kHz)): 10 W/cm$^2$
Power-supply power on high frequency side (high-frequency power supply made by Pearl Kogyo Co., Ltd. (13.56 MHz)): 5 W/cm$^2$ "A substrate X5 with ribs" was obtained by using the same method as the manufacturing method for the substrate A1 with ribs, except that the film-forming conditions were altered as shown below.

(Forming Conditions of Irregularities)
Discharge gas: $N_2$ gas
Reaction gas: 32% by volume of $O_2$ gas relative to all the gases.
Material gas: 1.4% by volume of tetraethoxysilane (TEOS) relative to all the gases
Film thickness: 65 nm
Power-supply power on low frequency side (high-frequency power supply made by Shinko electric Co., Ltd. (50 kHz)): 10 W/cm$^2$
Power-supply power on high frequency side (high-frequency power supply made by Pearl Kogyo Co., Ltd. (13.56 MHz)): 5 W/cm$^2$ "A substrate X6 with ribs" was obtained by using the same method as the manufacturing method for the substrate A1 with ribs, except that the film-forming conditions were altered as shown below.
(Forming Conditions of Irregularities)
Discharge gas: $N_2$ gas
Reaction gas: 0.005% by volume of $O_2$ gas relative to all the gases.
Material gas: 1.4% by volume of tetraethoxysilane (TEOS) relative to all the gases
Film thickness: 65 nm
Power-supply power on low frequency side (high-frequency power supply made by Shinko electric Co., Ltd. (50 kHz)): 10 W/cm$^2$
Power-supply power on high frequency side (high-frequency power supply made by Pearl Kogyo Co., Ltd. (13.56 MHz)): 30 W/cm$^2$ Evaluation
Measurements of Ra/Sm
Ra and Sm were measured on the contact face of the rib surface of the substrate with ribs to display particles as well as on the electrode-exposed face of the substrate with ribs by using the aforementioned method.

Initial Contrast

A DC voltage was applied to the image display apparatus in the following sequence of processes, and by measuring reflection density of a display image obtained by a voltage application, the display characteristics were evaluated. The voltage to be applied to the electrode on the upstream side in the visually recognizable direction of the image display apparatus was changed, with the other electrode being electrically grounded. The density was measured through processes in which five points on the display surface were measured at random by using a reflection densitometer (Sakura DENSI-TOMETER PDA-65: made by Konica Minolta Holdings, Inc.) and the average value thereof was used.

The contrast was evaluated based upon a density difference between black color density and white color density.

The black color density was a reflection density of the display surface obtained upon an application of a voltage of +200 V onto the electrode on the upstream side in the visually recognizable direction of the image display apparatus.

The white color density was a reflection density of the display surface obtained upon an application of a voltage of −200 V onto the electrode on the upstream side in the visually recognizable direction of the image display apparatus.

The contrast was evaluated based upon the following criteria: the contrast having 1.30 or more in the density difference was rated as the most superior (A); the contrast having 1.20 or more was rated as superior (3); the contrast having 1.10 or more was rated as acceptable (C) and the contrast having 1.10 or less was rated as rejected (D).

Contrast Durability

After alternately repeating voltage applications of +200 V and −200 V at 100,000 times, the resulting contrast was measured by using the same method as that of the initial contrast; thus the initial contrast durability was evaluated.

TABLE 1

| | | Surface roughness of substrate with ribs | | | | Contrast | | | |
| | | Contact face of rib to display particles | | Electrode exposed face | | Initial | | Durability | |
| | Kinds | Ra (μm) | Sm (μm) | Ra (μm) | Sm (μm) | Density difference | Rank | Density difference | Rank |
|---|---|---|---|---|---|---|---|---|---|
| Example 1 | A1 | 0.14 | 1.41 | 0.16 | 1.44 | 1.25 | B | 1.21 | B |
| Example 2 | A2 | 0.14 | 1.41 | 0.16 | 1.44 | 1.41 | A | 1.39 | A |
| Example 3 | A3 | 0.12 | 1.23 | 0.14 | 1.19 | 1.28 | B | 1.23 | B |
| Example 4 | A4 | 0.2 | 1.23 | 0.21 | 1.19 | 1.43 | A | 1.40 | A |
| Example 5 | A5 | 0.14 | 1.41 | 0.001 | 4.21 | 1.23 | B | 1.16 | C |
| Example 6 | A6 | 0.08 | 2.14 | 0.21 | 0.49 | 1.2 | B | 1.13 | C |
| Comparative Example 1 | X1 | 0.005 | 4.06 | 0.003 | 4.01 | 1.12 | C | 0.98 | D |
| Comparative Example 2 | X2 | 0.005 | 3.81 | 0.15 | 1.43 | 1.18 | C | 1.04 | D |
| Comparative Example 3 | X3 | 0.22 | 0.84 | 0.23 | 0.76 | 1.11 | C | 0.89 | D |
| Comparative Example 4 | X4 | 0.009 | 2.49 | 0.011 | 2.40 | 1.19 | C | 0.79 | D |
| Comparative Example 5 | X5 | 0.19 | 0.48 | 0.18 | 0.44 | 1.18 | C | 0.81 | D |
| Comparative Example 6 | X6 | 0.012 | 2.55 | 0.019 | 2.61 | 1.10 | C | 0.74 | D |

As shown clearly in the above Table, when the contact faces of ribs to the display particles satisfy the Ra and Sm specified in the present invention, it can be understood that the initial contrast is high and the durability contrast is low in degradation. In particular, when the hydrophobic treatment is made, excellent results are shown in Examples 2 and 4.

What is claimed is:

1. An image display apparatus, comprising:
   two substrates at least one of which is transparent;
   ribs for maintaining a distance between the substrates; and
   display particles that are sealed between the substrates in a powder state, and displaying an image by generating an electric field between the substrates so that the display particles are moved,
   wherein of contact faces to the display particles in the gap between the substrates, at least the contact faces of ribs to the display particles have an arithmetic average roughness Ra in a range from 0.01 to 0.20 μm and an average interval Sm of irregularities in a range from 0.5 to 2.5 μm.

2. The image display apparatus of claim 1, wherein the contact faces of ribs to the display particles have surface layers and the surface layers have an arithmetic average roughness Ra in a range from 0.01 to 0.20 μm and an average interval Sm of irregularities in a range from 0.5 to 2.5 μm.

3. The image display apparatus of claim 2, wherein the surface layers are formed by an atmospheric pressure plasma processing method.

4. The image display apparatus of claim 2, wherein the surface layers comprise an inorganic compound.

5. The image display apparatus of claim 2, wherein the surface layers comprise an organic compound.

6. The image display apparatus of claim 2, wherein the surface layers are subjected to a hydrophobic treatment.

7. The image display apparatus of claim 2, wherein the inorganic compound is selected from the group consisting of silicon oxide, titanium oxide, aluminum oxide, silicon nitride and titanium nitride.

8. The image display apparatus of claim 2, wherein the inorganic compound is silicon oxide.

9. The image display apparatus of claim 2, wherein the surface layers has a thickness within the range between 10 and 1,000 nm.

10. The image display apparatus of claim 2, wherein the surface layers has a thickness within the range between 50 and 500 nm.

11. The image display apparatus of claim 1, wherein Ra is 0.05 to 0.20 μm and Sm 1.00 to 2.00 μm.

* * * * *